United States Patent
Fukuda et al.

(10) Patent No.: US 10,703,972 B2
(45) Date of Patent: Jul. 7, 2020

(54) SOIL EROSION INHIBITOR

(71) Applicant: Denka Company Limited, Chuo-ku, Tokyo (JP)

(72) Inventors: Koichi Fukuda, Ichihara (JP); Hironori Konishi, Ichihara (JP); Kazuhiro Kote, Ichihara (JP); Ryuji Matsuno, Ichihara (JP)

(73) Assignee: Denka Company Limited, Chuo-ku, Tokyo (JP)

( * ) Notice: Subject to any disclaimer, the term of this patent is extended or adjusted under 35 U.S.C. 154(b) by 132 days.

(21) Appl. No.: 15/515,963

(22) PCT Filed: Oct. 1, 2015

(86) PCT No.: PCT/JP2015/078001
§ 371 (c)(1),
(2) Date: May 23, 2017

(87) PCT Pub. No.: WO2016/052718
PCT Pub. Date: Apr. 7, 2016

(65) Prior Publication Data
US 2017/0267927 A1   Sep. 21, 2017

(30) Foreign Application Priority Data
Oct. 2, 2014   (JP) ................. 2014-204208

(51) Int. Cl.
*C09K 17/20* (2006.01)
*E02D 17/20* (2006.01)
*C09D 123/08* (2006.01)
*E02D 3/00* (2006.01)

(52) U.S. Cl.
CPC ........ *C09K 17/20* (2013.01); *C09D 123/0853* (2013.01); *E02D 3/00* (2013.01); *E02D 17/20* (2013.01)

(58) Field of Classification Search
CPC ................. C09D 123/04; B05D 7/24
USPC .............................. 524/5, 556–571
See application file for complete search history.

(56) References Cited

U.S. PATENT DOCUMENTS

| | | | | |
|---|---|---|---|---|
| 4,277,426 A | * | 7/1981 | Kato | B01J 2/04 264/13 |
| 5,019,434 A | * | 5/1991 | Matsumoto | A61L 9/042 239/54 |
| 5,969,025 A | | 10/1999 | Corzani | |
| 2006/0128839 A1 | * | 6/2006 | Ferrall | C09K 17/16 524/5 |
| 2010/0189893 A1 | | 7/2010 | Vitale et al. | |

FOREIGN PATENT DOCUMENTS

| | | |
|---|---|---|
| CN | 102317410 A | 1/2012 |
| CN | 102875886 A | 1/2013 |
| JP | S56-095905 A | 8/1981 |
| JP | 2005-146266 A | 6/2005 |
| JP | 2006-036851 A | 2/2006 |
| JP | 2006-136851 A | 2/2006 |
| JP | 4048800 B2 | 2/2008 |

OTHER PUBLICATIONS

International Search Report dated Dec. 15, 2015, issued in corresponding International Application No. PCT/JP2015/078001, filed Oct. 1, 2015, 2 pages.
Chinese First Office Action dated Apr. 11, 2019, issued in Chinese Application No. 2015800534919, 11 pages.
Taiwan Office Action dated Feb. 23, 2019, issued in Taiwan Application No. 104132603, filed Oct. 2, 2015, 7 pages.

* cited by examiner

*Primary Examiner* — Monique R Peets
(74) *Attorney, Agent, or Firm* — Christensen O'Connor Johnson Kindness PLLC

(57) ABSTRACT

A soil erosion inhibitor is provided that includes resin powder excellent in moisture absorption resistance. According to the present invention, a soil erosion inhibitor is provided that includes redispersible synthetic resin powder having a bulk density of 0.50 g/mL or less.

4 Claims, No Drawings

SOIL EROSION INHIBITOR

TECHNICAL FIELD

The present invention relates to a soil erosion inhibitor that is preferably used to prevent soil erosion from a slope or the like formed by banking or cutting in construction of developed land for housing, a road, a dam, or the like.

BACKGROUND ART

Developed land for housing, a road, a dam, or the like is constructed by banking or cutting, and a slope thus formed is eroded by rainfall, weathering, or the like if left with no treatment, causing an accident such as a landslide and a rockslide. To cope with the situation, in PTL 1, soil erosion is prevented by spraying, on a slope, a spray material formulated with a soil drying inhibitor composed of a water-swelling and water-absorbing resin, a surfactant, and a synthetic resin emulsion at a ratio from 0.5 to 1.5 kg per 1 m$^3$ of a spray material.

Meanwhile, since the synthetic resin emulsion used in PTL 1 is in a liquid state, it has problems of freezing and costs for transportation. To solve such problems, PTL 2 discloses a technique of using resin powder produced by drying a synthetic resin emulsion as a soil erosion inhibitor.

CITATION LIST

Patent Literatures

PTL 1: Japanese Patent No. 4048800
PTL 2: JP 2006-36851A

SUMMARY OF THE INVENTION

Technical Problem

However, having investigated use of resin powder as disclosed in PTL 2 as a soil erosion inhibitor, the present inventors found a problem that the resin powder sometimes absorbs moisture to be solidified during long term storage.

The present invention has made in view of such circumstances, and it is an object thereof to provide a soil erosion inhibitor containing resin powder excellent in moisture absorption resistance.

Solution to Problem

According to the present invention, a soil erosion inhibitor is provided that includes redispersible synthetic resin powder having a bulk density of 0.50 g/mL or less.

In search of a factor for moisture absorption resistance, the present inventors investigated relationship between moisture absorption resistance and various physical properties of the resin powder to find out that the moisture absorption resistance of the resin powder is significantly improved with a bulk density of the powder of 0.50 g/mL or less, and thus have come to complete the present invention.

Various embodiments of the present invention are listed below as examples. The embodiments described below may be combined with each other.

Preferably, the synthetic resin has a glass transition temperature of 5° C. or less.

Preferably, the synthetic resin contains a structural unit derived from vinyl acetate.

Preferably, the synthetic resin is an ethylene-vinyl acetate copolymer.

According to another aspect of the present invention, a revegetation method using the above inhibitor is provided. According to still another aspect, a vegetation base including the above inhibitor at a ratio from 0.5 to 10 kg per 1 m$^3$ of bark compost is provided.

DESCRIPTION OF EMBODIMENTS

Embodiments of the present invention are described below in detail.

A soil erosion inhibitor of the present invention contains redispersible synthetic resin powder having a bulk density of 0.50 g/mL or less. The soil erosion inhibitor is excellent in moisture absorption resistance. The soil erosion inhibitor is preferably composed of the above synthetic resin powder while it may contain a material other than the above powder.

The "redispersible synthetic resin powder" is powder to be in an emulsified state when dispersed in water. Such synthetic resin powder is produced by, for example, powdering an aqueous resin emulsion by a method such as spray drying (commercially available as emulsion powder). Since the synthetic resin powder is redispersible, the powder is added to a spray material for redispersion of the powder by the moisture in the spray material to exhibit binding strength.

The aqueous resin emulsion available for producing the synthetic resin powder is not particularly limited in type. Examples of the emulsion include a vinyl acetate resin emulsion, a vinyl acetate copolymer emulsion, an acrylic ester resin emulsion, a styrene-acrylic ester copolymer emulsion, an ethylene-vinyl acetate copolymer emulsion, a styrene-butadiene copolymer emulsion, a vinylidene resin emulsion, a polybutene resin emulsion, an acrylonitrile-butadiene resin emulsion, a methacrylate-butadiene resin emulsion, an asphalt emulsion, an epoxy resin emulsion, a urethane resin emulsion, a silicon resin emulsion, and the like. Among them, emulsions of a resin containing a structural unit derived from vinyl acetate (a vinyl acetate resin emulsion, a vinyl acetate copolymer emulsion, an ethylene-vinyl acetate copolymer emulsion, etc.) are preferred, and an ethylene-vinyl acetate copolymer emulsion is more preferred. The synthetic resin for the synthetic resin powder is preferably a resin in the emulsions listed above, more preferably a synthetic resin containing a structural unit derived from vinyl acetate, and particularly preferably an ethylene-vinyl acetate copolymer.

A method of producing the aqueous resin emulsion is not particularly limited, and the emulsion may be produced by, for example, adding an emulsifier and a monomer to a dispersion medium having water as a main component and emulsion polymerizing the monomer with stirring.

The synthetic resin powder has a bulk density of 0.50 g/mL or less. This is because a higher bulk density causes a decrease in moisture absorption resistance. A lower limit of the bulk density is for example, but not particularly limited to, 0.3, 0.35, or 0.4 g/mL. The bulk density tends to decrease for a smaller particle size of the powder. A too low bulk density causes a smaller particle size of the powder, resulting in easy rise of the powder and difficulty in handling, which are not preferred. The bulk density of the synthetic resin powder may be controlled by drying conditions and post-processing (grinding, classification, etc.) conditions after drying during production of the synthetic resin powder by spray drying the aqueous resin emulsion. The bulk density is preferably measured in a powdered state.

The synthetic resin of the synthetic resin powder has a glass transition temperature (Tg) of, for example, 20° C. or less and preferably 5° C. or less. This is because a too large Tg causes a decrease in soil erosion inhibition property for use in a low temperature environment. A lower limit of Tg is for example, but not particularly limited to, −25° C. or −20° C. A too low Tg causes softening of the coating after curing and a decrease in strength, which are not preferred. Tg may be controlled by altering composition of the synthetic resin. For example, when the synthetic resin is an ethylene-vinyl acetate copolymer, Tg tends to increase with a greater vinyl acetate content. For example, Tg may be 5° C. or less by having a vinyl acetate content of 87 wt % or less.

A method of using the soil erosion inhibitor of the present invention is then described. The soil erosion inhibitor is available for preparing a vegetation base by being added to a spray material mainly of soil mixed with seeds, fertilizer, and the like. The vegetation base is then sprayed on a surface to be protected for revegetation of the surface. The soil erosion inhibitor of the present invention is thus available for a method of revegetation of a surface to be protected. Examples of a construction method of spraying the vegetation base on an application surface may include, but not particularly limited to, seed dispersal, additional soil spraying, base spraying, and the like. For a vast application surface, another example may be spraying by seeding from an aircraft, such as a helicopter.

Examples of the spray material to be used may include, but not particularly limited, organic soil conditioners, such as bark compost and peat moss, and a mixture of sandy soil with seeds, fertilizer, and the like.

The amount of the soil erosion inhibitor to be added is not particularly limited and preferably from 0.5 to 10 kg (more preferably from 1 to 4 kg) per 1 m$^3$ of the spray material.

EXAMPLES

Examples and Comparative Examples of the present invention are described below. Unless otherwise specified in the following description, "parts" and "%" respectively denote "parts by mass" and "mass %".

In Examples and Comparative Examples shown in Table 1 below, various commercially available redispersible EVA powders were used having a bulk density, a glass transition temperature (Tg), and a vinyl acetate content (VA content) that were different from those in each powder. The description below explains the methods of measuring the bulk density, Tg, and the VA content and the methods of evaluating the moisture absorption resistance and erosion inhibition properties.

Bulk Density

In accordance with JIS K 6721:1977, the bulk density was measured by the following method. As a bulk density meter, JIS bulk specific gravity meter JIS-K-6721 manufactured by Tsutsui Scientific Instruments Co., Ltd. was used. First, 120 mL of a sample with a solid fraction of 98.0 mass % or more was weighed in a metal bowl not to generate static electricity and the entire sample was stirred 10 times with a scoopula. The sample was then put in a funnel with a damper, followed by immediate removal of the damper and the sample was gently dropped in the cylinder at a constant rate. The sample risen from the cylinder was gently scraped off along the cylinder top, and then the weight of the cylinder was measured in 0.1 g. From the weight and the volume (100 mL) of the sample, the bulk density (g/mL) was obtained down to the third decimal place. The density was repeatedly measured at N=3 to obtain an average, which was then rounded off to the second decimal place.

Glass Transition Temperature (Tg)

The glass transition temperature (Tg) was measured by the following method.

First, a powder sample was reemulsified in pure water to prepare 40 w % of a redispersed emulsion. Next, the redispersed emulsion was poured in a mold to be dried at 23° C. for 5 days to prepare a film with a thickness from 0.3 to 0.5 mm. The film thus prepared was used as a sample for measurement with a DSC (EXSTAR6000 DSC-6200 manufactured by Seiko Instruments & Electronics Ltd.) in accordance with JIS K 7121. In the DSC curve, Tg was determined as an intersection of the tangent of the baseline and the tangent of the sharp downward slope in the endothermic region due to glass transition.

Vinyl Acetate Content (VA Content)

The vinyl acetate content (VA content) was measured by the following method.

First, a sample was added to deuteriochloroform for ultrasonication, and the solubles were subjected to 1H-NMR measurement at 25° C. The composition ration was obtained from Equation 1 below to calculate the VA content. The values "86" and "28" in Equation 1 denote the respective molecular weights of vinyl acetate monomer unit and ethylene monomer unit. The value "4" in Equation 1 denotes the number of equivalent protons in the ethylene monomer unit to calculate a peak area per proton by dividing the peak area by the number of protons.

$$VA\text{(vinyl acetate monomer unit)}: Et\text{(ethylene monomer unit)(mass ratio)} = S_{VA} \times 86 : (S_1 - S_{VA} - S_2)/4 \times 28 \quad \text{Equation 1}$$

$S_{VA}$: peak area from 4.60 to 5.25 ppm (the peak derived from underlined protons in the vinyl acetate monomer unit (—C$\underline{H}$(OCOCH3)-CH2-))

$S_1$: peak area from 1.02 to 3.00 ppm (the peak derived from underlined protons in the ethylene monomer unit (—C$\underline{H2}$-C$\underline{H2}$-)+the peak derived from the above protons in the vinyl acetate monomer unit+the peak derived from protons of water)

$S_2$: peak area of and around 1.6 ppm (the peak derived from protons of water)

Moisture Absorption Resistance Evaluation

In an aluminum cup (bottom of ϕ4.5 cm, depth of 2.7 cm (model: round 8A)), 7.3 g of a sample was put and flattened. The sample was then left in an environmental test chamber (conditions of 60° C., 95% H, 8 d). It was then taken out of the chamber to observe the state of the sample, which was evaluated by the following criteria.

⊙: Powder particles were not bound to each other, and returned to a state equivalent to that before put in the chamber by applying a small force.

○: Powder particles were not bound to each other, and returned to a state equivalent to that before put in the chamber by applying a small force while a small number of tiny clusters were found.

x: Powder particles were bound to each other, and did not return to the powder state even by application of a force.

Soil Erosion Inhibition Evaluation

A vegetation base for thick layer base spraying formulated with the prepared sample was produced by the following method to measure the amount of soil erosion due to a rainfall test.

(1) Mixing: in a container, 7 l of bark compost (Fujimisoil No. 5 produced by Fujimi Kankyo Ryokuka Co., Ltd.), 21 g of high-analysis compound fertilizer (15-15-15 produced by Nittofc Co., Ltd.), 3.5 g of seeds (Italian ryegrass produced by Kaneko Seeds Co., Ltd.), and 3.5 g of various samples (erosion inhibitor) were added and kneaded to make a vegetation base.

(2) Application: the vegetation base was filled in a wooden frame and flattened, and then compressed from above to half volume.

(3) Maturation: the wooden frame was removed for overnight maturation in a room at 23° C. or in an environmental test chamber at 5° C.

(4) Rainfall test: the maturated vegetation base was subjected to rainfall with a watering pot.

The vegetation base was inclined at 9° and the rainfall was given from a height of 50 cm with an intensity of 200 mm per hour for 30 min. The dried weight of the soil erosion was measured to be evaluated by the following criteria. The soil was dried in conditions of overnight air dry and then at 105° C. for 3 hours.

⊙: Compared with the reference (vegetation base with no EVA powder), 30% or less of soil erosion ○: Compared with the reference, from 31% to 60% of soil erosion x: Compared with the reference, 61% or more of soil erosion

TABLE 1

| Sample | Bulk Density (g/mL) | Tg (° C.) | VA Content (wt %) | Moisture Absorption Resistance | Erosion Inhibition Properties 23° C. Maturation | Erosion Inhibition Properties 5° C. Maturation |
|---|---|---|---|---|---|---|
| Example 1 | 0.42 | −1 | 87 | ⊙ | ⊙ | ⊙ |
| Example 2 | 0.43 | −16 | 77 | ⊙ | ⊙ | ⊙ |
| Example 3 | 0.48 | −12 | 78 | ⊙ | ⊙ | ⊙ |
| Example 4 | 0.44 | 1 | 86 | ⊙ | ⊙ | ⊙ |
| Example 5 | 0.47 | −5 | 83 | ⊙ | ⊙ | ⊙ |
| Example 6 | 0.47 | 11 | 89 | ⊙ | ⊙ | ○ |
| Example 7 | 0.45 | 8 | 89 | ○ | ⊙ | ○ |
| Example 8 | 0.48 | 8 | 90 | ○ | ⊙ | ○ |
| Example 9 | 0.49 | 15 | 91 | ○ | ⊙ | ○ |
| Comparative Example 1 | 0.54 | 12 | 90 | x | ⊙ | ○ |
| Comparative Example 2 | 0.54 | −15 | 78 | x | ⊙ | ⊙ |
| Comparative Example 3 | 0.55 | 8 | 88 | x | ⊙ | ○ |

Discussion

As shown in Table 1, in all Examples having a bulk density of 0.50 g/mL or less, the moisture absorption resistance was good. In contrast, in all Comparative Examples having a bulk density of more than 0.50 g/mL, the moisture absorption resistance was poor. Among Examples 1 to 9, Examples 1 to 5 with Tg of 5° C. or less had better erosion inhibition properties for maturation at 5° C.

The invention claimed is:

1. A soil erosion inhibitor, comprising redispersible synthetic resin powder having a bulk density of 0.50 g/mL or less, wherein the synthetic resin contains a structural unit derived from vinyl acetate and has a vinyl acetate content of 87 wt % or less, and the synthetic resin has a glass transition temperature of 5° C. or less.

2. The inhibitor of claim 1, wherein the synthetic resin is an ethylene-vinyl acetate copolymer.

3. A revegetation method, comprising using the inhibitor of claim 1.

4. A vegetation base, comprising the inhibitor of claim 1 at a ratio from 0.5 to 10 kg per 1 m³ of a spray material.

* * * * *